W. E. D. STOKES, Jr. & G. W. DAVIS.
RECEIVING CIRCUIT FOR WIRELESS TELEGRAPHY AND TELEPHONY.
APPLICATION FILED OCT. 9, 1908.
1,001,228.
Patented Aug. 22, 1911.
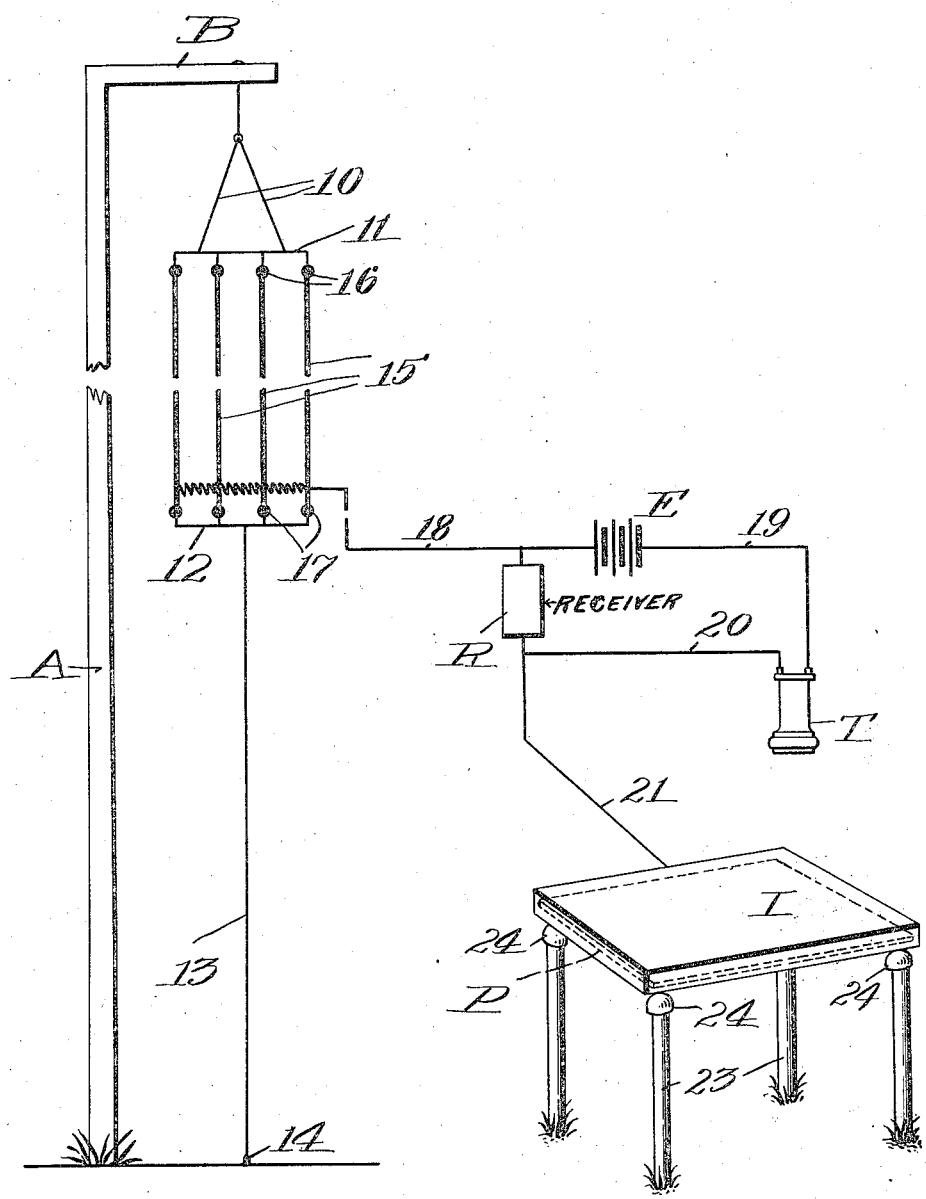

UNITED STATES PATENT OFFICE.

WILLIAM E. D. STOKES, JR., OF NEW YORK, N. Y., AND GEORGE W. DAVIS, OF GALILEE, NEW JERSEY, ASSIGNORS TO WILLIAM E. D. STOKES, OF NEW YORK, N. Y.

RECEIVING-CIRCUIT FOR WIRELESS TELEGRAPHY AND TELEPHONY.

1,001,228.  Specification of Letters Patent.  Patented Aug. 22, 1911.

Application filed October 9, 1908.  Serial No. 457,013.

*To all whom it may concern:*

Be it known that we, WILLIAM E. D. STOKES, Jr., and GEORGE W. DAVIS, citizens of the United States, residing at New York, in the county of New York and State of New York, and at Galilee, in the county of Monmouth and State of New Jersey, respectively, have invented a new and useful Receiving-Circuit for Wireless Telegraphy and Telephony, of which the following is a specification.

In wireless telegraphy and telephony difficulty is encountered in the receiving circuit by the static electricity in the atmosphere tending to discharge through the aerial to the ground. These discharges affect the action of the receiving circuit. To overcome this difficulty, instead of connecting the aerial to the ground we connect the same to a large insulated plate arranged on insulated supports from six to twelve feet above the ground, so that said plate forms a capacity, and in some sense a condenser, the other surface of which condenser is formed by the earth. The wires forming the aerial are insulated so that the entire device will be kept from moisture.

The device is illustrated in the accompanying drawing which represents in diagram an arrangement for practicing the invention.

Referring to the drawing and in detail, A designates an upright mast which carries a horizontal arm B. Suspended from this cross-arm by ropes 10—10 is a cross arm 11. 12 designates a lower cross-arm which may be steadied by a wire rope 13 connected to a base or support 14. A number of wires are arranged between the cross arms 11 and 12. These wires are preferably covered with insulating material and are insulated from the cross-arms 11 and 12 by suitable insulators 16 and 17. The wires 15 are metallically connected to a wire 18 covered with insulation which wire extends to the receiving station.

R designates the receiver connected to which is a circuit 19 and 20 which may include a telephone receiver T and a battery E. The receiver R is also connected by a wire 21 wound with insulation to a large copper plate P. This copper plate is embedded in insulating material I, so that no moisture can reach the same. This insulation may be provided by sheathing the plate with strips of rubber, then varnishing or cementing the entire device, so that the same is absolutely moisture proof. The plate P is supported on posts 23 which have porcelain insulators 24 at the top. The plate is supported some six to twelve feet above the surface of the earth. For ordinary short distances we use a copper plate having an area of about fifty square feet. By this arrangement the plate P provides a capacity so that the waves picked up by the aerial can operate through the receiving device R, as the plate forms, in view of its position relatively to the earth, a condenser, the other surface of which may be considered as the ground.

In view of the fact that the entire receiving circuit is insulated and separated from the ground, no moisture can collect on any metallic part of the receiving circuit, and static discharges from the atmosphere are prevented.

The details and arrangements herein shown and described may be greatly varied by a skilled mechanic without departing from the scope of our invention as expressed in the claims.

Having thus fully described our invention, what we claim and desire to secure by Letters-Patent is:—

1. A receiving circuit comprising an aerial, a large plate connected therewith and embedded in insulated material, and arranged parallel with the ground, said plate forming a condenser, the other surface of which is formed by the ground.

2. A receiving circuit comprising an aerial formed of insulated wire, and a large copper plate connected to the aerial, said plate being embedded in insulating material, and supported parallel with the ground by insulating standards.

3. A receiving circuit comprising an aerial made up of insulated wires, a single insulated wire connected thereto, a large copper plate to which said wire is connected, said copper plate being embedded in insulated material and supported by posts at some distance from and parallel with the ground, said posts having insulating connections with the plate.

In testimony whereof we have hereunto set our hands in the presence of two subscribing witnesses.

WILLIAM E. D. STOKES, Jr.
GEORGE W. DAVIS.

Witnesses:
FREDERICK L. SEARING,
A. H. GLEASON.